US010731001B2

United States Patent
Schon et al.

(10) Patent No.: US 10,731,001 B2
(45) Date of Patent: Aug. 4, 2020

(54) METHOD FOR THE RECOVERY OF COMPOUNDS DERIVING FROM THE SYNTHESIS OF POLY ARYL ETHER KETONE POLYMERS

(71) Applicant: Arkema France, Colombes (FR)

(72) Inventors: Steven Gabriel Schon, Strafford, PA (US); Andrew Richard Goddard, Malvern, PA (US); Julien Jouanneau, Bryn Mawr, PA (US)

(73) Assignee: ARKEMA FRANCE, Colombes (FR)

( * ) Notice: Subject to any disclaimer, the term of this patent is extended or adjusted under 35 U.S.C. 154(b) by 41 days.

(21) Appl. No.: 16/185,485

(22) Filed: Nov. 9, 2018

(65) Prior Publication Data

US 2020/0148822 A1    May 14, 2020

(51) Int. Cl.
*B01D 1/22* (2006.01)
*C08G 65/46* (2006.01)
*C08G 65/40* (2006.01)

(52) U.S. Cl.
CPC ............. *C08G 65/46* (2013.01); *B01D 1/223* (2013.01); *C08G 65/4018* (2013.01); *C08G 65/4093* (2013.01)

(58) Field of Classification Search
CPC .... B01D 1/223; C08G 65/46; C08G 65/4018; C08G 65/4093
See application file for complete search history.

(56) References Cited

U.S. PATENT DOCUMENTS

| | | | | | |
|---|---|---|---|---|---|
| 3,980,529 | A | * | 9/1976 | Wilhelm | B01D 1/0082 203/89 |
| 4,017,354 | A | * | 4/1977 | Marchenko | B01D 1/223 159/6.1 |
| 4,839,459 | A | * | 6/1989 | Darnell | C08G 61/127 528/220 |
| 4,968,758 | A | * | 11/1990 | Matzner | C08G 61/127 525/471 |
| 7,976,818 | B2 | * | 7/2011 | Vincenzi | B01D 1/223 203/29 |
| 2003/0111186 | A1 | | 6/2003 | Parrillo et al. | |
| 2008/0069761 | A1 | * | 3/2008 | Vincenzi | B01D 1/223 423/492 |
| 2011/0132551 | A1 | * | 6/2011 | Klapdohr | B01D 1/223 159/49 |
| 2011/0201775 | A1 | | 8/2011 | Louis et al. | |
| 2014/0100382 | A1 | * | 4/2014 | Jessup | B01D 1/223 558/34 |
| 2019/0040189 | A1 | * | 2/2019 | Le | C08G 61/127 |

FOREIGN PATENT DOCUMENTS

| | | |
|---|---|---|
| JP | 53111394 A | 9/1978 |
| JP | 5515604 A | 2/1980 |

* cited by examiner

*Primary Examiner* — Jonathan Miller
(74) *Attorney, Agent, or Firm* — Buchanan Ingersoll & Rooney P.C.

(57) ABSTRACT

A method for treating a shear-thinning residue composition deriving from the synthesis of an aryl ether ketone, the residue composition including a liquid fraction and solid residues, the method including the steps of: passing said shear-thinning residue composition through a shear-generating evaporating device, between a rotating part and a stationary part; and recovering a condensed liquid fraction and separately recover concentrated solid residues.

26 Claims, 2 Drawing Sheets

METHOD FOR THE RECOVERY OF COMPOUNDS DERIVING FROM THE SYNTHESIS OF POLY ARYL ETHER KETONE POLYMERS

TECHNICAL FIELD

Embodiments of the present invention relate to a method for the recovery of compounds that derive from the synthesis of aryl ether ketones.

TECHNICAL BACKGROUND

Aryl ether ketones (AEK), notably poly aryl ether ketone polymers (PAEK) have a number of properties which make them useful for applications involving exposure to high temperature or to high mechanical or chemical stress. They are, for instance, useful in the aerospace industry, in offshore drilling and in medical devices.

At the end of the manufacture process of the AEKs, the residual solvents, the unconverted reactants, the reaction by-products along with remaining unrecovered particles of the AEK compounds often form a viscous slurry which is difficult to handle and is prone to plugging the equipment due to the deposition of solids. Furthermore, not only is the slurry classified as hazardous waste, but also the recovery and recycling of the reaction solvents and/or reactants from the slurry is considered to be a difficult procedure which requires high costs.

Conventional means for handling such slurries involves the use of a large quantity of solvent during the manufacture process or the addition of diluent fluids in order to reduce the viscosity or increase the dilution of the slurry. However, this results in larger volumes and costs associated with the handling and disposal of hazardous waste.

Document JP 555-15604 discloses a device for removing volatile substances from a high viscosity composition, and more particularly for removing residual tobacco and remaining solvents from a thermoplastic resin, by using a thin-film evaporator.

Document JP 553-111394 discloses a method for removing remaining monomers from a polyamide resin, by using a thin-film evaporator.

Document US 2011/0201775 discloses a method for removing impurities found in diphenyl sulfone, the solvent used for the synthesis of poly aryl ether ketone polymers and more specifically for the synthesis of poly ether ketone and poly ether ether ketone polymers, in order to improve the polymer properties. One of the approaches employed makes use of a thin-film evaporator.

Document US 2003/0111186 discloses a method for removing all solvent from a solution containing a polyphenylene ether polymer resin, the method employing the use of a wiped thin film evaporator.

There is still a need for a method for recovering residual solvents and reactants from residues related to the synthesis of aryl ether ketones in a simple and cost-effective way, in order to reduce raw material costs, while at the same time minimizing the volume and the hazardous nature of the waste.

SUMMARY

It is a first object of the invention to provide a method for treating a shear-thinning residue composition deriving from the synthesis of an aryl ether ketone, said residue composition comprising a liquid fraction and solid residues, the method comprising the steps of:
(i) passing said shear-thinning residue composition through a shear-generating evaporating device, between a rotating part and a stationary part; and
(ii) recovering a condensed liquid fraction and separately recovering concentrated solid residues.

According to some embodiments, a shear rate is applied to the shear-thinning residue composition by the shear-generating evaporating device, the shear rate being equal to or greater than $10\ s^{-1}$, preferably equal to or greater than $250\ s^{-1}$, more preferably equal to or greater than $1000\ s^{-1}$, and even more preferably equal to or greater than $2500\ s^{-1}$.

According to some embodiments, the shear-thinning residue composition has a zero shear viscosity at 25° C. from 1 to 10000 Pa·s, preferably from 1 to 1000 Pa·s, more preferably from 1 to 100 Pa·s and even more preferably from 5 to 50 Pa·s.

According to some embodiments, the minimum distance between the rotating part and the stationary part of the shear-generating evaporating device is from 0.03 to 5 mm, and preferably from 0.05 to 3.5 mm.

According to some embodiments, the aryl ether ketone is chosen from 1,4-bis(4-phenoxybenzoyl)benzene and/or a poly ether ketone ketone polymer.

According to some embodiments, the liquid fraction of the shear-thinning residue composition comprises at least one residual solvent and/or at least one residual reactant.

According to some embodiments, the residual solvent is chosen from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof; and wherein the residual solvent is preferably ortho-dichlorobenzene.

According to some embodiments, the residual reactant is diphenyl ether.

According to some embodiments, the solid residues comprise aryl ether ketone particles such as 1,4-bis(4-phenoxybenzoyl)benzene and/or a poly ether ketone ketone polymer, and/or reaction by-products resulting from an incomplete conversion to the reaction products and/or by-products resulting from a side reaction.

According to some embodiments, the shear-generating evaporating device is chosen from a horizontal thin-film evaporator, a vertical thin-film evaporator, a horizontal wiped-film evaporator, a vertical wiped-film evaporator, a scraped-surface heat exchanger, a single-screw devolatilizing extruder, and a twin-screw devolatilizing extruder.

According to some embodiments, the method described above is carried out as a batch process, or a semi-batch process, or a continuous process.

According to some embodiments, the shear-thinning residue composition has a solids concentration before step (i) from 5 to 25 wt. %, and preferably from 15 to 20 wt. %.

According to some embodiments, the shear-thinning residue composition is brought to a temperature in the shear-generating evaporating device equal to or greater than 160° C., preferably equal to or greater than 170° C., and more preferably equal to or greater than 175° C.

According to some embodiments, the method further comprises a subsequent step of:
(iii) using the concentrated solid residues as a fuel source.

According to some embodiments, the condensed liquid fraction recovered in step (ii) is recycled in the synthesis of the aryl ether ketone, and preferably in the synthesis of 1,4-bis(4-phenoxybenzoyl)benzene and/or the synthesis of a poly ether ketone ketone polymer.

According to some embodiments, the condensed liquid fraction recovered in step (ii) comprises at least one residual solvent and at least one residual reactant which are separated prior to recycling and are recycled separately.

According to some embodiments, from 65 to 99 wt. % and more preferably from 75 to 97 wt. % of the liquid fraction of the shear-thinning residue composition is recovered in the recovered condensed liquid fraction.

According to some embodiments, the method described above comprises a preliminary step of providing the shear-thinning residue composition, said preliminary step comprising recovering a mother liquor from the synthesis of an aryl ether ketone, distilling said mother liquor and recovering the shear-thinning residue composition as a distillation residue.

A second object of the invention is to provide a method for manufacturing an aryl ether ketone, comprising:
    reacting a reactant A with a reactant B in a reaction solvent, so as to obtain a product mixture comprising the aryl ether ketone, wherein reactant A is a difunctional aromatic molecule containing one or more oxygen atoms, wherein reactant B is a difunctional aromatic molecule containing one or more halogen atoms;
    subjecting the product mixture to a solid/liquid separation so as to recover a purified aryl ether ketone and to separately recover a mother liquor; and
    either:
        subjecting the mother liquor to the method described above in the first object of the invention, said mother liquor forming part or all of the shear-thinning residue composition; or
        distilling said mother liquor, recovering a shear-thinning residue composition as a distillation residue, and subjecting said recovered shear-thinning residue composition to the method described above in the first object of the invention.

According to some embodiments, the aryl ether ketone is 1,4-bis(4-phenoxybenzoyl)benzene, reactant A is terephthaloyl chloride and reactant B is diphenyl ether.

According to some embodiments, the aryl ether ketone is a poly ether ketone ketone polymer, reactant A is a difunctional aromatic acyl chloride and reactant B is 1,4-bis(4-phenoxybenzoyl)benzene.

According to some embodiments, the method comprises a preliminary stage of manufacturing 1,4-bis(4-phenoxybenzoyl)benzene according to a method described above, and wherein, optionally, the shear-thinning residue composition deriving from the synthesis of 1,4-bis(4-phenoxybenzoyl) benzene is at least partially mixed with the shear-thinning residue composition deriving from the synthesis of the poly ether ketone ketone polymer prior to subjecting them to the method for treating a shear-thinning composition as described above.

According to some embodiments, the reaction solvent is chosen from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof; and wherein the reaction solvent is preferably ortho-dichlorobenzene.

According to some embodiments, the solid/liquid separation step comprises a filtration step, preferably a centrifugal filtration step.

Embodiments of the present invention provide a method for recovering residual solvents and/or reactants from residues related to the synthesis of aryl ether ketones in a simple and cost-effective way, in order to reduce raw material costs, while at the same time minimizing the volume and the hazardous nature of the waste.

Embodiments of the invention rely on the unexpected realization that compositions deriving from the synthesis of aryl ether ketones and containing residual solvents, reactants, products and/or by-products, although highly viscous, may have shear-thinning properties. This makes them suitable for being treated in a shear-generating evaporating device such as a thin film evaporator, a devolatilizing extruder, or the like.

Embodiments of the invention thus advantageously comprise passing such a shear-thinning composition (viscous slurry) comprising a liquid fraction and solid residues through an evaporating device under shear, to reduce the viscosity of the slurry, which improves heat transfer. In addition, the mixture of residual reactants, and (non-volatile) by-products present in the composition, can affect the melting temperatures of the residual reactants. In fact, the presence of the byproducts makes it easier to melt some or all of the (solid) reactants, so after evaporation, they can be handled in molten form, instead of as solid. Therefore, evaporated residual solvents and residual reactants can be recovered on the one hand, while a concentrated residue can be collected on the other hand, allowed to be cooled and solidified before being safely disposed of.

This is surprising, as compositions having a high solids content would be rather expected to be highly viscous and hinder heat transfer, and remaining solids and non-volatile material would be expected to bake onto the evaporator surfaces and not be dischargeable from the evaporator.

In embodiments, the evaporator is advantageously operated at a sufficiently high shear rate and temperature to keep the un-evaporated portion in an at least partially liquefied (molten) state. Embodiments of the invention have the advantages of reducing raw material costs for the AEK production process, minimizing the volume and reducing the hazardous nature of wastes, and/or simplifying the handling and reducing the disposal costs of the residues.

DESCRIPTION OF EMBODIMENTS

Embodiments of the invention will now be described in more detail without limitation in the following description.

The term "deriving from" (the synthesis, a slurry, a phase) is used to indicate the origin of a component/product and means "originating from".

AEK compounds By "aryl ether ketone" or "AEK", is meant a compound comprising patterns of formula (—Ar—X—) and of formula (—Ar'—Y—), wherein:

Ar and Ar' each designate an aromatic divalent radical;
Ar and Ar' can preferably be chosen from 1,3-phenylene, 1,4-phenylene, 4,4'-biphenylene, 1,4-naphthylene, 1,5-naphthylene and 2,6-naphthylene, possibly substituted;
X designates an electro-attracting group which can be preferably chosen from a carbonyl group and a sulfonyl group;
Y designates a group chosen from an oxygen atom, a sulfur atom, an alkylene group, such as for example —CH$_2$— or isopropylidene.

The AEK comprises at least one pattern of formula (—Ar—X—), at least one pattern of formula (—Ar'—Y—) and preferably at least three of these patterns in total. Preferably, the AEK comprises at least two patterns of formula (—Ar—X—) and at least two patterns of formula (—Ar'—Y—).

In some embodiments, at least 50 mol. %, preferably at least 70 mol. % and more preferably at least 80 mol. % of groups X within the AEK represent a carbonyl group. According to some embodiments, all groups X within the AEK represent a carbonyl group.

In some embodiments, at least 50 mol. %, preferably at least 70 mol. % and more preferably at least 80 mol. % of groups Y within the AEK represent an oxygen atom. According to some embodiments, all groups Y within the AEK represent an oxygen atom.

According to some embodiments, the AEK is a compound comprising, or preferably consisting of patterns of the formula (—Ar—CO—), patterns of the formula (—Ar'—O—), as well as end groups preferably selected from H or an aromatic group (more preferably a phenyl group), the groups Ar and Ar' being as defined above.

According to some embodiments, the AEK is a compound comprising or preferably consisting of: fewer than 15 patterns of the formula (—Ar—CO—) and/or patterns of the formula (—Ar'—O—), preferably fewer than 10 patterns, more preferably fewer than 7 patterns and even more preferably fewer than 5 patterns of the formula (—Ar—CO—) and/or patterns of the formula (—Ar'—O—); as well as end groups preferably selected from H or an aromatic group (more preferably a phenyl group).

According to some embodiments, the AEK is a compound having the formula (Ar$_1$—O—Ar$_2$—CO—Ar$_3$—CO—Ar$_4$—O—Ar$_5$), wherein each of Ar$_2$, Ar$_3$ and Ar$_4$ independently represent an aromatic divalent radical, preferably a phenylene, and wherein Ar$_1$ and Ar$_5$ represent an aromatic monovalent radical preferably a phenyl group.

The bonds on either side of each radical Ar$_2$, Ar$_3$, and Ar$_4$ can be of the type para, or meta, or ortho (preferably para or meta).

According to some embodiments, the AEK is 1,4-bis(4-phenoxybenzoyl)benzene.

According to other embodiments, the AEK is a poly aryl ether ketone (PAEK).

Thus, according to some embodiments, the PAEK is a polymer comprising, or preferably consisting of patterns of the formula (—Ar—CO—), patterns of the formula (—Ar'—O—), as well as end groups preferably selected from H or an aromatic group (more preferably a phenyl group), the groups Ar and Ar' being as defined above.

According to some embodiments, the PAEK is a poly ether ketone ketone (PEKK), comprising a succession of repeated patterns of the type —(Ar$_1$—O—Ar$_2$—CO—Ar$_3$—CO)$_n$—, wherein each of Ar$_1$, Ar$_2$ and Ar$_3$ independently represent an aromatic divalent radical, preferably a phenylene.

In this formula, like in the following formulas, n represents an integer. In some embodiments, n is at least 2, or at least 10, or at least 50, or at least 100, or at least 500, or at least 1000, up to, for example, n of 1,000,000.

The bonds on either side of each radical Ar$_1$, Ar$_2$ and Ar$_3$ can be of the type para, or meta, or ortho (preferably para or meta).

According to some embodiments, the PEKK comprises a succession of repeated patterns of the following formula (IA) and/or the following formula (IB):

The patterns of formula (IA) derive from isophthalic acid (or patterns I), while patterns of formula (IB) derive from terephthalic acid (or patterns T).

According to some embodiments, the mass proportion of patterns T in relation to the totality of patterns T and I can vary from 0 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 100%.

A range from 35 to 100%, notably from 55 to 85% and even more specifically from 60 to 80%, is particularly appropriate. In all ranges mentioned herein, the terminal values are included unless otherwise stated.

According to some embodiments, the PAEK is a poly ether ether ketone (PEEK), comprising a succession of repeated patterns of the type —(Ar$_1$—O—Ar$_2$—O—Ar$_3$—CO)$_n$—, wherein each of Ar$_1$, Ar$_2$ and Ar$_3$ independently represent an aromatic divalent radical, preferably a phenylene. In some embodiments, n is at least 2, or at least 10, or at least 50, or at least 100, or at least 500, or at least 1000, up to, for example, n of 1,000,000.

The bonds on either side of each radical Ar$_1$, Ar$_2$ and Ar$_3$ can be of the type para, or meta, or ortho (preferably para or meta).

According to some embodiments, the PEEK comprises a succession of repeated patterns of formula (II):

and/or a succession of repeated patterns of formula (III):

(III)

and/or a succession of repeated patterns of formula (IV):

(IV)

and/or a succession of repeated patterns of formula (V):

(V)

According to some embodiments, the PAEK is a poly ether ketone (PEK), comprising a succession of repeated patterns of the type —$(Ar_1—O—Ar_2—CO)_n$—, wherein each of $Ar_1$ and $Ar_2$ independently represent an aromatic divalent radical, preferably a phenylene. In some embodiments, n is at least 2, or at least 10, or at least 50, or at least 100, or at least 500, or at least 1000, up to, for example, n of 1,000,000.

The bonds on either side of each radical $Ar_1$ and $Ar_2$ can be of the type para, or meta, or ortho (preferably para or meta).

According to some embodiments, the PEK comprises a succession of repeated patterns of formula (VI):

(VI)

According to some embodiments, the PEK comprises a succession of repeated patterns of formula (VII):

(VII)

In this formula, as for the following formulas, x and y represent integers. In some embodiments, each of x and y is at least 2, or at least 10, or at least 50, or at least 100, or at least 500, or at least 1000, up to, for example, n of 1,000,000.

According to some embodiments, the PEK comprises a succession of repeated patterns of formula (VIII):

(VIII)

According to some embodiments, the PAEK is a poly ether ether ketone ketone (PEEKK), comprising a succession of repeated patterns of the type —$(Ar_1—O—Ar_2—O—Ar_3—CO—Ar_4—CO)_n$—, wherein each of $Ar_1$, $Ar_2$, $Ar_3$ and $Ar_4$ independently represent an aromatic divalent radical, preferably a phenylene. In some embodiments, each of x and y is at least 2, or at least 10, or at least 50, or at least 100, or at least 500, or at least 1000, up to, for example, n of 1,000,000.

The bonds on either side of each radical $Ar_1$, $Ar_2$, $Ar_3$ and $Ar_4$ can be of the type para, or meta, or ortho (preferably para or meta).

According to some embodiments, the PEEKK comprises a succession of repeated patterns of formula (IX):

(IX)

According to some embodiments, the PAEK is a poly ether ether ether ketone (PEEEK), comprising a succession of repeated patterns of the type —$(Ar_1—O—Ar_2—O—Ar_3—O—Ar_4—CO)_n$—, wherein each of $Ar_1$, $Ar_2$, $Ar_3$ and $Ar_4$ independently represent an aromatic divalent radical, preferably a phenylene. In some embodiments, n is at least 2, or at least 10, or at least 50, or at least 100, or at least 500, or at least 1000, up to, for example, n of 1,000,000.

The bonds on either side of each radical $Ar_1$, $Ar_2$, $Ar_3$ and $Ar_4$ can be of the type para, or meta, or ortho (preferably para or meta).

According to some embodiments, the PEEEK comprises a succession of repeated patterns of formula (X):

(X)

According to some embodiments, the PAEK is a poly ether ketone ether ketone ketone (PEKEKK), comprising a succession of repeated patterns of the type —($Ar_1$—O—$Ar_2$—CO—$Ar_3$—O—$Ar_4$—CO—$Ar_5$—CO)$_n$—, wherein each of $Ar_1$, $Ar_2$, $Ar_3$, $Ar_4$ and $Ar_5$ independently represent an aromatic divalent radical, preferably a phenylene. In some embodiments, n is at least 2, or at least 10, or at least 50, or at least 100, or at least 500, or at least 1000, up to, for example, n of 1,000,000.

The bonds on either side of each radical $Ar_1$, $Ar_2$, $Ar_3$, $Ar_4$ and $Ar_5$ can be of the type para, or meta, or ortho (preferably para or meta).

According to some embodiments, the PAEK is a poly ether ether ketone ether ketone (PEEKEK), comprising a succession of repeated patterns of the type —($Ar_1$—O—$Ar_2$—O—$Ar_3$—CO—$Ar_4$—O—$Ar_5$—CO)$_n$—, wherein each of $Ar_1$, $Ar_2$, $Ar_3$, $Ar_4$ and $Ar_5$ independently represent an aromatic divalent radical, preferably a phenylene. In some embodiments, n is at least 2, or at least 10, or at least 50, or at least 100, or at least 500, or at least 1000, up to, for example, n of 1,000,000.

The bonds on either side of each radical $Ar_1$, $Ar_2$, $Ar_3$, $Ar_4$ and $Ar_5$ can be of the type para, or meta, or ortho (preferably para or meta).

According to some embodiments, the PAEK is according to the general formula described above, wherein some of the radicals Ar and/or Ar' represent a divalent radical deriving from diphenyl or biphenol.

According to some embodiments, the PAEK is a poly ether diphenyl ether ketone (PEDEK), comprising a succession of repeated patterns of the type —($Ar_1$—O-D-O—$Ar_2$—CO)$_n$—, wherein each of $Ar_1$ and $Ar_2$ independently represent an aromatic divalent radical, preferably a phenylene, and D represents a divalent radical deriving from diphenyl. In some embodiments, n is at least 2, or at least 10, or at least 50, or at least 100, or at least 500, or at least 1000, up to, for example, n of 1,000,000.

The bonds on either side of each radical $Ar_1$ and $Ar_2$ can be of the type para, or meta, or ortho (preferably para or meta).

According to some embodiments, the PEDEK comprises a succession of repeated patterns of formula (XI):

(XI)

According to some embodiments, the PAEK comprises two or more of those repeated patterns. According to a preferred embodiment, the PAEK is a PEEK-PEDEK copolymer.

1,4-bis(4-phenoxybenzoyl)benzene and a PEKK polymer are particularly preferred as the AEK compounds.

Manufacture of 1,4-bis(4-phenoxybenzoyl)benzene

1,4-bis(4-phenoxybenzoyl)benzene is the compound of formula (XII):

(XII)

It may be made by reacting terephthaloyl chloride of formula (XIII):

(XIII)

with diphenyl ether of formula (XIV):

(XIV)

in a solvent (the reaction solvent), and preferably in the presence of a Lewis acid, acting as a Friedel-Crafts catalyst.

The reaction results in the production of the compound of formula (XII) which is predominantly in the form of a complex with the Lewis acid.

During the reaction, 4-(4-phenoxybenzoyl)benzoic acid of formula (XV) can be produced to some extent:

(XV)

The corresponding 4-(4-phenoxybenzoyl)benzoic acid ester can also be formed as a by-product during manufacturing.

The other main impurities produced by the reaction are xanthydrol moiety-containing molecules.

The reaction solvent is preferably a non-protic solvent.

A protic solvent is a solvent containing at least one hydrogen atom bound to an oxygen or nitrogen atom, and which is therefore able to donate protons to reagents.

A non-protic solvent is a solvent which is not a protic solvent.

The non-protic solvent used herein can in particular be selected from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof.

Ortho-dichlorobenzene is the most preferred solvent.

Lewis acids which may be used include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. Aluminum trichloride, boron trichloride, aluminum tribromide, titanium tetrachloride, antimony pentachloride, ferric chloride, gallium trichloride, and molybdenum pentachloride are preferred. Aluminum trichloride is particularly preferred.

The reaction between the compounds of formulas (XIII) and (XIV) to make the compound of formula (XII) is performed in a reactor. The reactor can be for instance a glass reactor, a glass-lined reactor or a stainless-steel reactor.

According to some variations, the materials introduced into the reactor in the method of embodiments of the invention consist essentially, or consist, of the compounds of formulas (XIII) and (XIV), the reaction solvent and the Lewis acid.

According to embodiments of the invention, an initial reactant mixture comprising (and preferably consisting of) terephthaloyl chloride and diphenyl ether in the reaction solvent is provided. The reactant mixture can be made by mixing the three components together, in any order. By way of example, the solvent can be introduced first in the reactor, and then the two reactants can be added to the reactor.

As a second step, the Lewis acid is added to the reactant mixture. Preferably, the Lewis acid is added as a solid. Alternatively, it can also be added as a suspension or a solution, preferably in the abovementioned solvent.

Alternatively, any other addition order is possible. For example, the Lewis acid can be premixed with the terephthaloyl chloride and/or with the diphenyl ether and/or with the reaction solvent, prior to mixing the terephthaloyl chloride with the diphenyl ether.

Once the reaction has been completed to the desired degree, the reactant mixture becomes designated as a product mixture.

The reaction at stake is exothermic. Preferably, a temperature control system is provided, in order to control the temperature of the reactant mixture in the reactor, in particular during and after addition of the Lewis acid. The temperature control system may in particular comprise a temperature sensor within the reactor and may be configured to cool and/or to heat the reactant mixture. Preferably, it is at least configured to cool the reactant mixture.

Devices for heating and/or cooling the reactant mixture may include a heat exchanger inside the reactor or in a recirculation loop, or a heat exchange fluid circuit in the jacket of the reactor.

According to a preferred embodiment, the reactant mixture is cooled during and possibly, also after the step of adding the Lewis acid, in order to prevent an excessively large or rapid increase in temperature of the reactant mixture as the reactants start reacting with each other.

A method of an embodiment of the invention may comprise steps (after the reaction has been completed to the desired degree) for purifying 1,4-bis(4-phenoxybenzoyl)benzene from the product mixture, and in particular from the solvent, catalyst and unreacted reactants as well as by-products.

In some embodiments, a 1,4-bis(4-phenoxybenzoyl)benzene precipitate is recovered by a solid/liquid separation step and optionally washed to remove residual Lewis acid, diphenyl ether and solvent. The mother liquor resulting from the solid/liquid separation primarily contains solvent(s) (and in particular the reaction solvent) and diphenyl ether, along with by-products (such as dimers, xanthydrol moiety-containing molecules). Also present are fine particles of 1,4-bis(4-phenoxybenzoyl)benzene that have not been properly collected with the bulk of solid 1,4-bis(4-phenoxybenzoyl)benzene.

The solid/liquid separation step is preferably a filtration step, a centrifugation step or a sedimentation step, and more preferably a filtration step.

In some embodiments, the product mixture may preliminarily be put in contact with a protic solvent, so as to recover the Lewis acid and separately recover 1,4-bis(4-phenoxybenzoyl)benzene.

The protic solvent can in particular be an organic solvent, such as methanol, acetic acid, formic acid, ethanol, isopropanol, and benzyl alcohol. Methanol is preferred as an organic solvent.

Alternatively, the protic solvent can be an aqueous solution.

Mixtures of the above solvents can also be used, such as an aqueous-organic solvent, e.g. an aqueous solution mixed with methanol.

The aqueous solution can be simply water. Alternatively, it can be an acidic solution, such as a solution of hydrochloric acid, phosphoric acid, sulfuric acid, nitric acid, an organic acid such as formic acid and any combination of these.

In case the protic solvent is an aqueous solution, at the end of the step of putting the product mixture in contact with the protic solvent, a first phase (containing the protic solvent) and a second phase (containing the reaction solvent) are obtained. The first phase is thus an aqueous phase and the second phase is an organic phase. 1,4-bis(4-phenoxybenzoyl)benzene is mostly present in the second phase, while the Lewis acid is mostly present in the first phase.

Alternatively, in case the protic solvent is an organic solvent, the reaction solvent and the protic solvent are miscible with each other or they can even form one single phase.

The first phase and second phase may be separated so as to be recovered separately, preferably by decantation.

The first phase contains the Lewis acid and can be further treated, or recycled, or disposed of, or preferably marketed or re-used in a different industrial process.

The second phase contains 1,4-bis(4-phenoxybenzoyl)benzene mostly in a solid/precipitated form.

In some variations, the organic phase is optionally put in contact again with a protic solvent, as described above, so as to recover again a first phase and a second phase. This operation may be repeated several times if desired, before the second phase is further treated.

The second phase is then subjected to the abovementioned solid/liquid separation step.

Alternatively, 1,4-bis(4-phenoxybenzoyl)benzene may be directly recovered from the mixture of first phase and second phase without prior separation of the first phase and second phase, by subjecting this mixture to said solid/liquid separation step.

Solid 1,4-bis(4-phenoxybenzoyl)benzene, together with residual impurities, is recovered after the solid/liquid separation step.

In preferred variations, said solid 1,4-bis(4-phenoxybenzoyl)benzene is further purified by washing it in a protic solvent. The use of a protic solvent is advantageous as 1,4-bis(4-phenoxybenzoyl)benzene is highly insoluble in such a solvent. The protic solvent at this stage can be an aqueous solution. However, in preferred variations, the protic solvent at this stage is an organic solvent. Methanol is a particularly preferred solvent. Other possibilities include e.g. acetic acid, formic acid, ethanol, isopropanol, and benzyl alcohol.

After the washing step or concomitantly with the washing step, another solid/liquid separation step may be performed.

If use is made of a centrifugal filtration device for the solid/liquid separation, washing and filtering may be performed concomitantly in this device.

The washing and solid/liquid separation steps may optionally be repeated one or more times, in exactly the same manner or in a different manner. For example, different protic solvents, different washing durations and/or different temperatures may be used in the various washing and solid/liquid separation steps.

After the last solid/liquid separation, the recovered solid may be dried, preferably at atmospheric pressure or under vacuum in an oven or a dryer.

Ultimately, 1,4-bis(4-phenoxybenzoyl)benzene in a substantially pure form, i.e. at a purity of at least 98.5 wt. %, preferably 99.0 wt. % and more preferably 99.5 wt. %, is recovered.

The purity of 1,4-bis(4-phenoxybenzoyl)benzene may be determined by a number of methods, including nuclear magnetic resonance, differential scanning calorimetry, gas chromatography or high-performance liquid chromatography (HPLC). Preferably, said purity is determined by HPLC.

In the course of the manufacturing process, the mother liquor from the solid/liquid separation is collected.

According to some embodiments, the mother liquor may derive from the first phase.

According to other embodiments, the mother liquor may derive from the second phase.

According to other embodiments, the mother liquor may derive from the first and from the second phase.

Preferably, the mother liquor derives from the second phase.

In case the protic solvent is an organic solvent and as the reaction solvent and the protic solvent are miscible with each other, the mother liquor may derive from the one single phase which is formed.

According to some embodiments, the mother liquor may also contain the liquid deriving from the washing step(s). Alternatively, the liquid deriving from the washing step(s) may be recovered and/or recycled separately.

The mother liquor may comprise residual solvents and/or residual reactants such as unconverted diphenyl ether and/or unrecovered 1,4-bis(4-phenoxybenzoyl)benzene particles and/or metallic salts and/or reaction by-products such as xanthydrol moiety-containing molecules and 4-(4-phenoxybenzoyl)benzoic acid (and/or derivatives) resulting from the incomplete conversion of diphenyl ether to 1,4-bis(4-phenoxybenzoyl)benzene.

The mother liquor can be further treated as described in more detail below.

Manufacture of PEKK

In order to manufacture a PEKK polymer, 1,4-bis(4-phenoxybenzoyl)benzene is reacted with at least one difunctional aromatic acyl chloride.

Alternatively, the PEKK polymer may be directly produced by reacting diphenylether with at least one difunctional aromatic acyl chloride.

The difunctional aromatic acyl chloride may in particular include terephthaloyl chloride, isophthaloyl chloride and more preferably a mixture of terephthaloyl chloride and isophthaloyl chloride.

The reaction is preferably implemented in a solvent. The solvent is preferably a non-protic solvent, which can in particular be selected from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, 1,1,2,2-tetrachloroethane, tetrachloroethylene, dichloromethane, nitrobenzene and mixtures thereof. Ortho-dichlorobenzene is the most preferred solvent.

The reaction is preferably implemented in the presence of a Lewis acid as a catalyst.

Lewis acids which may be used include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. Aluminum trichloride, boron trichloride, aluminum tribromide, titanium tetrachloride, antimony pentachloride, ferric chloride, gallium trichloride, and molybdenum pentachloride are preferred. Aluminum trichloride is particularly preferred.

The polymerization can be implemented in the same reactor as the one used for the production of 1,4-bis(4-phenoxybenzoyl)benzene. However, more preferably, it is implemented in one or more other reactors.

In some embodiments, a PEKK precipitate is recovered by a solid/liquid separation step and washed to remove residual Lewis acid, 1,4-bis(4-phenoxybenzoyl)benzene and solvent. The mother liquor resulting from the solid/liquid separation primarily contains solvents along with by-products and fine particles of PEKK that have not been properly collected with the bulk of solid PEKK.

The solid/liquid separation step is preferably a filtration step, a centrifugation step or a sedimentation step, and more preferably a filtration step.

Prior to the solid/liquid separation step, the mixture containing the PEKK polymer may be first mixed with a protic solvent so as to provide a PEKK slurry.

The protic solvent used to make the PEKK slurry may be e.g. methanol.

The PEKK polymer can then be recovered from the PEKK slurry e.g. by filtration.

If necessary, the polymer can be washed, preferably by a protic solvent such as methanol, and subjected to solid/liquid separation, again, e.g. filtrated, once or several times. Washing can be performed for example by re-slurrying the polymer in the solvent.

In the course of the manufacturing process, the mother liquor from the solid/liquid separation is collected.

According to some embodiments, the mother liquor may derive from the PEKK slurry mixture.

According to some embodiments, the mother liquor may also contain the liquid deriving from the washing step(s). Alternatively, the liquid deriving from the washing step(s) may be recovered and/or recycled separately.

This mother liquor may primarily comprise residual solvents and/or residual reactants, such as unconverted 1,4-bis(4-phenoxybenzoyl)benzene and/or unrecovered PEKK polymer particles and/or reaction by-products such as dimers, trimers and more generally oligomers resulting from the incomplete conversion of 1,4-bis(4-phenoxybenzoyl) benzene to the PEKK polymer.

Manufacture of other AEKs

The synthesis of AEKs such as other PAEK polymers, can be carried out through an electrophilic route or through a nucleophilic route. A method of an embodiment of the present invention is particularly useful for the synthesis of PAEK through the electrophilic route.

In order to manufacture a AEK compound, such as a PAEK polymer, a reactant A which is a difunctional aromatic molecule containing one or more oxygen atoms is reacted with a reactant B which is a difunctional aromatic molecule containing one or more halogen atoms in a reaction solvent.

According to some embodiments, reactant A can be chosen from p-hydroquinone, 4,4'-biphenol, 1,4-bis-(p-hydroxybenzoyl)benzene and 1,3-bis-(p-hydroxybenzoyl)benzene.

According to some embodiments, reactant B can be a dihalobenzophenone, preferably 4,4'-difluorobenzophenone.

According to some embodiments, reactant A can be deprotonated by using a base, chosen for example from sodium hydroxide, sodium carbonate and potassium carbonate.

The reaction is preferably implemented in a solvent. The solvent is preferably a non-protic solvent, which can in particular be selected from diphenyl sulfone, carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, 1,1,2,2-tetrachloroethylene, tetrachloroethylene, dichloromethane, nitrobenzene and mixtures thereof. Ortho-dichlorobenzene and diphenyl sulfone are the most preferred solvents.

The reaction between the reactant A and reactant B is performed in a reactor. The reactor can be for instance a glass reactor, a glass-lined reactor or a stainless-steel reactor.

In some embodiments, an AEK (e.g. PAEK) precipitate is recovered by a solid/liquid separation step and washed to remove residual reactants, by-products and solvent. The mother liquor resulting from the solid/liquid separation primarily contains solvents along with by-products and fine particles of AEK (e.g. PAEK) that have not been properly collected with the bulk of solid AEK (e.g. PAEK).

The solid/liquid separation step is preferably a filtration step, a centrifugation step or a sedimentation step, and more preferably a filtration step.

Prior to the solid/liquid separation step, the mixture containing the AEK (e.g. PAEK) may be first mixed with a solvent so as to provide a AEK (e.g. PAEK) slurry.

The solvent used to make the AEK (e.g. PAEK) slurry may be e.g. acetone or methanol.

The AEK (e.g. PAEK) can then be recovered from the AEK (e.g. PAEK) slurry e.g. by filtration.

If necessary, the compound can be washed, preferably by an organic solvent, and subjected to solid/liquid separation, again, e.g. filtrated, once or several times. Washing can be performed for example by re-slurrying the compound in the solvent.

In the course of the manufacturing process, the mother liquor from the solid/liquid separation is collected.

According to some embodiments, the mother liquor may derive from the AEK (e.g. PAEK) slurry mixture.

According to some embodiments, the mother liquor may also contain the liquid deriving from the washing step(s). Alternatively, the liquid deriving from the washing step(s) may be recovered and/or recycled separately.

This mother liquor may primarily comprise residual solvents and/or residual reactants, and/or unrecovered AEK (e.g. PAEK) particles and/or reaction by-products such as dimers, trimers and more generally oligomers resulting from the incomplete conversion of reactant A and/or reactant B to the AEK (e.g. PAEK).

Recovery of Residual Solvents and Reactants

The mother liquor obtained from the synthesis of an AEK is a residue composition comprising a liquid fraction which contains at least one residual solvent and/or at least one residual reactant and solid residues which contain unrecovered products and/or metallic salts and/or reaction by-products.

More specific compositions of the mother liquor in the case of the synthesis of 1,4-bis(4-phenoxybenzoyl)benzene or of PEKK have already been described above.

Also, a mixture of a mother liquor from the synthesis of 1,4-bis(4-phenoxybenzoyl)benzene and of a mother liquor from the synthesis of PEKK may be provided.

The mother liquor can then be treated in order to recover a condensed liquid fraction containing residual solvent(s) and/or residual reactants on the one hand, and concentrated solid residues on the other hand.

According to some embodiments, the mother liquor can undergo a distillation step in order to recover a portion of the residual solvent(s) and separately obtain the "residue composition deriving from the synthesis of an AEK." Alternatively, the mother liquor may constitute the "residue composition deriving from the synthesis of an AEK" itself, without any intermediate distillation step.

In any case, the residue composition deriving from the synthesis of an AEK comprises a liquid fraction which contains at least one residual solvent and/or at least one residual reactant and solid residues which contain unrecovered products and/or metallic salts and/or reaction by-products. By "solid residues" is meant residues that are present as solid particles in the composition at a temperature of 20° C.

According to some embodiments, the residue composition deriving from the synthesis of an AEK comprises a residual solvent which may be chosen from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane and nitrobenzene. Preferably, the residual solvent is ortho-dichlorobenzene.

According to some embodiments, the residue composition deriving from the synthesis of an AEK comprises a residual reactant, which is preferably diphenyl ether and/or 1,4-bis(4-phenoxybenzoyl)benzene.

The residue composition deriving from the synthesis of an AEK may in particular contain from 0 to 99%, preferably from 10 to 90%, and more preferably from 20 to 50% by mass of residual solvent(s), preferably ortho-dichlorobenzene.

The residue composition deriving from the synthesis of an AEK may in particular contain from 0 to 99%, preferably from 20 to 90%, and more preferably from 40 to 80% by mass of residual reactant, preferably diphenyl ether.

The residue composition deriving from the synthesis of an AEK may in particular contain from 0 to 99%, preferably from 2 to 40%, and more preferably from 5 to 25% by mass of solid residues.

The residue composition deriving from the synthesis of an AEK is shear-thinning. This means that the composition is a non-Newtonian fluid, wherein the viscosity decreases under shear strain.

In some embodiments, this residue composition is characterized in that its viscosity at 25° C. decreases by a factor of at least 2, or at least 5, or at least 10, or at least 15, from a shear rate of 0.1 $s^{-1}$ to a shear rate of 50 $s^{-1}$, as measured by standard viscometric/rheological methods. As an example, it can be measured using an Anton Paar MCR500 rheometer with a CC27 couette geometry.

The zero shear viscosity of the residue composition at 25° C. may range from 1 to 10000 Pa·s, preferably from 1 to 1000 Pa·s, more preferably from 1 to 100 Pa·s and even more preferably from 5 to 50 Pa·s. The zero shear viscosity of the residue composition is measured using a rotational rheometer according to ISO 6721-10.

The residue composition may be treated according to an embodiment of the invention by:
(i) passing said residue composition through a shear-generating evaporating device, between a rotating part and a stationary part; and
(ii) recovering a condensed liquid fraction and separately recovering concentrated solid residues on the other hand.

The concentrated solid residues are preferably in a molten and/or slurried form.

By way of example, the shear-generating evaporating device may comprise two assemblies: a heated body which is the stationary part and a rotor which is the rotating part, the rotor being placed inside the heating body. The shear-generating evaporating device can operate under vacuum, or for example, under a reduced pressure of 0.1 to 100 kPa, or 0.1 to 30 kPa, or 0.1 to 10 kPa, or 0.1 to 5 kPa. The residue composition can enter the shear-generating evaporating device tangentially from one end of the heating body and be distributed evenly over the inner surface of the wall of the heating body due to the rotation of the rotor. More specifically, rotor blades present on the rotor may spread the residue composition as a thin layer over the entire wall of the heating body, or substantially the entire wall, and generate highly turbulent flow conditions in the thin layer of residue composition. The residue composition may thus spiral down the wall of the heating body, while the turbulent conditions developed by the rotor blades generate optimal heat flux, rapidly evaporating volatile compounds. The resulting vapors can flow through and out of the shear-generating evaporating device from the one end of the heating body, while the concentrated solid residues leave the shear-generating evaporating device through the opposite end of the heating body.

The resulting vapors can then be led to a condenser where they are converted back to a condensed liquid fraction and are recovered.

The shear-generating evaporating device can be notably chosen from a horizontal thin-film evaporator, a vertical thin-film evaporator, a horizontal wiped-film evaporator, a vertical wiped-film evaporator, a single-screw devolatilizing extruder, and a twin-screw devolatilizing extruder.

Preferably, the residue composition derives from the synthesis of 1,4-bis(4-phenoxybenzoyl)benzene and/or the synthesis of a PEKK polymer. In this case, the residue composition deriving from the synthesis of 1,4-bis(4-phenoxybenzoyl)benzene and/or the synthesis of a PEKK polymer can be treated separately in the shear-generating evaporating device. Alternatively, the two residue compositions can be combined prior to their treatment in the shear-generating evaporating device.

According to some embodiments, a shear rate is applied to the residue composition deriving from the synthesis of an AEK by the shear-generating evaporating device. The shear rate can be equal to or greater than $10\ s^{-1}$, preferably equal to or greater than $250\ s^{-1}$, more preferably equal to or greater than $1000\ s^{-1}$ and even more preferably equal to or greater than $2500\ s^{-1}$, up to, for example, $100,000\ s^{-1}$.

For example, the shear rate can be from 10 to $50\ s^{-1}$; or from 50 to $100\ s^{-1}$; or from 100 to $150\ s^{-1}$; or from 150 to $200\ s^{-1}$; or from 200 to $250\ s^{-1}$; or from 250 to $500\ s^{-1}$; or from 500 to $1000\ s^{-1}$; or from 1000 to $1500\ s^{-1}$; or from 1500 to $2000\ s^{-1}$; or from 2000 to $2500\ s^{-1}$; or greater than $2500\ s^{-1}$, up to, for example, $100,000\ s^{-1}$.

The shear rate which is applied to the residue composition can be defined as the speed of the radial end of the rotating part divided by the minimum distance between the rotating part and the stationary part of the evaporating device. The speed of the rotating part is equal to the number of revolutions per second of the rotating part, multiplied by the distance traveled by the radial end of the rotating part during one revolution.

The rotating part of the shear-generating evaporating device can be a close-clearance rotating part. According to some embodiments, the minimum distance between the rotating part and the stationary part of the shear-generating evaporating device is from 1.5 to 5 mm, preferably from 2 to 4 mm, and more preferably from 2.5 to 3.5 mm. The minimum distance between the rotating part and the stationary part of the shear-generating evaporating device can notably be from 1.5 to 2 mm; or from 2 to 2.5 mm; or from 2.5 to 3 mm; or from 3 to 3.5 mm; or from 3.5 to 4 mm; or from 4 to 4.5 mm; or from 4.5 to 5 mm.

Before the entrance of the residue composition in the shear-generating evaporating device, the residue composition can have a solids concentration from 5 to 25 wt. %, and preferably from 15 to 20 wt. %. The solids concentration of the residue composition before its entrance to the evaporating device can therefore be from 5 to 10 wt. %; or from 10 to 15 wt. %; or from 15 to 20 wt. %; or from 20 to 25 wt. %. The solids concentration can be measured by summing the percentage by weight (wt. %) of all the compounds having a boiling point greater than 300° C. at atmospheric pressure as measured by GC, HPLC, or NMR.

According to some embodiments, while the residue composition is in the shear-generating evaporating device it may be at a temperature equal to or greater than 160° C., preferably equal to or greater than 170° C., and even more preferably equal to or greater than 175° C., up to, for example, 300° C. For example, the temperature of the residue composition in the shear-generating evaporating device can be from 160 to 165° C.; or from 165 to 170° C.; or from 170 to 175° C.; or from 175 to 180° C.; or from 180 to 185° C.; or from 185 to 190° C.

According to some embodiments, the residence time of the residue composition in the shear-generating evaporating device, between the stationary part and the rotating part, is from 30 seconds to 30 minutes, preferably from 2 to 5 minutes.

According to some embodiments, the pressure inside the shear-generating evaporating device during the operation is equal to or less than 3500 Pa, and more preferably from 1300 to 3000 Pa. For example, the pressure inside the shear-generating evaporating device can be from 500 to 1300 Pa; or from 1300 to 2000 Pa; or from 2000 to 3000 Pa; or from 3000 to 3500 Pa.

According to some embodiments, the shear-generating evaporating device can also operate with a mass flux of 100 to 780 kg/h·m² of heated surface, and preferably of 220 to 670 kg/h·m² of heated surface.

The method of treating the residue composition deriving from the synthesis of an AEK in the shear-generating evaporating device can be a batch process, or a semi-batch process. Alternatively and advantageously, the method of treating the residue composition deriving from the synthesis of an AEK is a continuous process.

The condensed liquid fraction which is recovered can then be recycled in the synthesis of an AEK and preferably can be recycled in the synthesis of 1,4-bis(4-phenoxybenzoyl) benzene and/or the synthesis of a PEKK polymer.

The recovered condensed liquid fraction can comprise at least one residual solvent or at least one residual reactant or both. In the case where the recovered condensed liquid fraction comprises both, the at least one residual solvent and the at least one residual reactant can be recycled as such, or can be separated before recycling. The separation can be carried out by any convenient means such as distillation, crystallization or membrane separation.

Alternatively, vapors exiting the shear-generating evaporating device can first be separated before being condensed and recovered. This separation can be carried out by distillation of the vapors after the vapors exit the shear-generating evaporating device and before their condensation. In this case, the at least one residual solvent and the at least one residual reactant are condensed and recycled separately.

According to some embodiments, 65 to 99 wt. % and more preferably 75 to 97 wt. % of the liquid fraction in the residue composition is recovered in the recovered condensed liquid fraction after the residue composition passes through the shear-generating evaporating device. For example, from 65 to 70 wt. %; or from 70 to 75 wt. %; or from 75 to 80 wt. %; or from 80 to 85 wt. %; or from 85 to 90 wt. %; or from 90 to 95 wt. %; or from 95 to 99 wt. % of the liquid fraction can be recovered in the condensed liquid fraction after the composition passes through the shear-generating evaporating device.

According to some embodiments, the recovered condensed liquid fraction comprises less than 200 ppm by weight of solid residues, for example 0.1 ppm to 200 ppm, and more preferably less than 100 ppm by weight of solid residues.

The recovered condensed liquid fraction can notably comprise less than 5 ppm by weight of solid residues, for example, 0.1 to 5 ppm, or from 5 to 10 ppm; or from 10 to 25 ppm; or from 25 to 50 ppm; or from 50 to 75 ppm; or from 75 to 100 ppm; or from 100 to 125 ppm; or from 125 to 150 ppm; or from 150 to 175 ppm; or from 175 to 200 ppm by weight of solid residues.

The recovered concentrated solid residues can be transferred from the shear-generating evaporating device and collected, in order to cool and solidify. The recovered concentrated solid residues can comprise unrecovered AEK particles and/or metallic salts and/or reaction by-products resulting from an incomplete conversion to the reaction products and/or by-products resulting from a side reaction.

According to some embodiments, the unrecovered AEK particles are 1,4-bis(4-phenoxybenzoyl)benzene particles.

According to some embodiments, the unrecovered AEK particles are PEKK particles.

According to some embodiments, the recovered concentrated solid residues are pumped out of the shear-generating evaporating device, in order to be discharged into collection containers. The recovered concentrated solid residues can for example be pumped out of the shear-generating evaporating device by using an external positive displacement pump or an internal screw mechanism. The recovered concentrated solid residues may be allowed to solidify e.g. as blocks, flakes, strands, pellets, etc.

Alternatively, the recovered concentrated solid residues are extruded via a die, cooled and pelletized, in order to facilitate handling and transport of the solidified concentrated solid residues.

According to some embodiments, the recovered concentrated solid residues are used as a fuel source.

EXAMPLES

The following examples illustrate embodiments of the invention without limiting it.

1,4-bis(4-phenoxybenzoyl)benzene was synthesized by reacting terephthaloyle chloride with diphenyl ether in 1,2-dichlorobenzene, and in the presence of aluminum trichloride. After the reaction, the product mixture was put in contact with an acidic aqueous phase. The organic phase was then subjected to a solid/liquid separation and the filtrate was sent to a distillation column. A residue composition deriving from the synthesis of 1,4-bis(4-phenoxybenzoyl) benzene was obtained after distillation, and the composition contained approximately 51 wt. % diphenyl ether (DPE), 37 wt. % ortho-dichlorobenzene (ODCB), and 13 wt. % of low-volatile materials and 1,4-bis(4-phenoxybenzoyl)benzene solids. The residue composition was observed to be a light-brown, highly viscous slurry.

Figure 1:
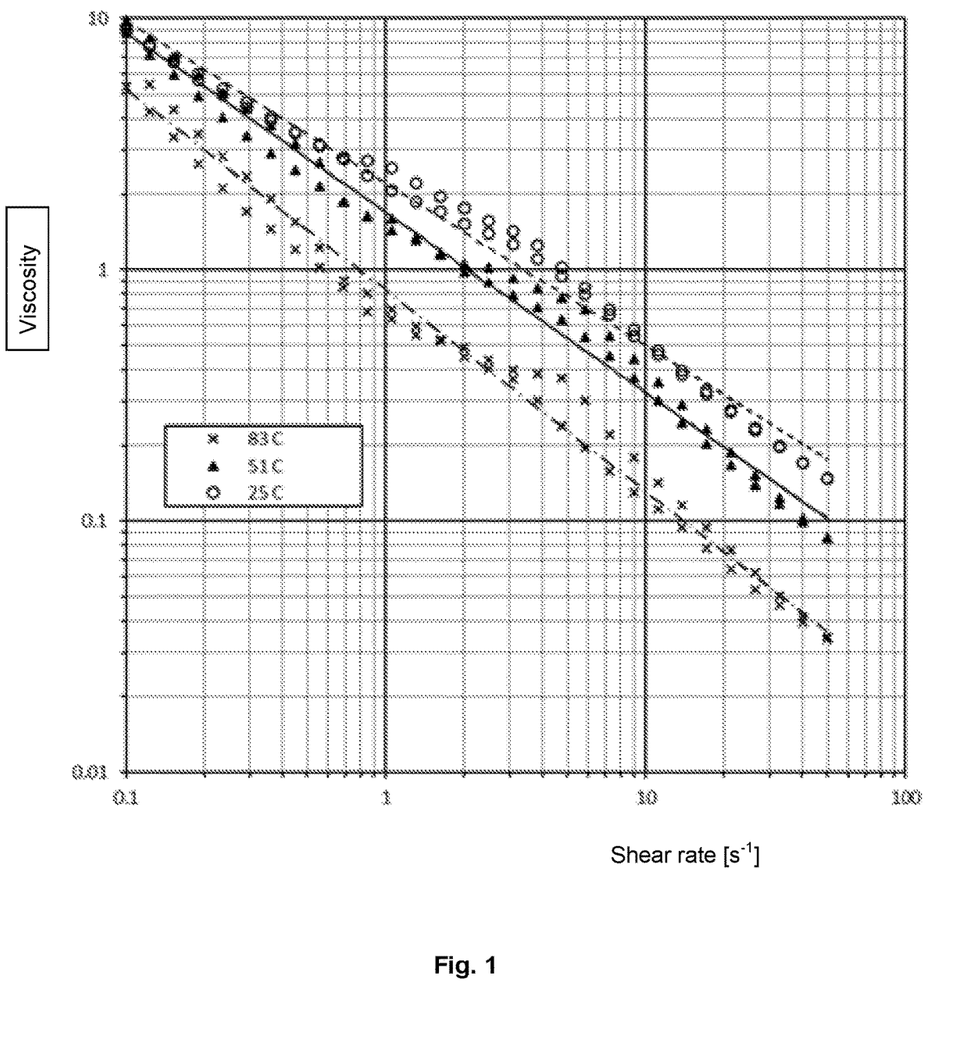
FIG. 1 shows the viscosity (in Pa·s) of a residue composition deriving from the synthesis of 1,4-bis(4-phenoxybenzoyl)benzene as a function of the shear rate (in $s^{-1}$) at 25° C. (circles), 51° C. (triangles) and 83° C. (crosses).

Rheometry measures confirmed that the residue composition was shear thinning. The rheometry measures were carried out by using an Anton Paar MCR500 rheometer with a CC27 couette geometry. As illustrated in FIG. 1 the residue composition viscosity decreases as the shear rate increases at 25° C. (circles), 51° C. (triangles) and at 83° C. (crosses), approximately following a power-law function of the shear rate (lines fitted to the data).

A PEKK polymer was synthesized. A residue composition deriving from the synthesis of PEKK was obtained after distillation, and the composition contained approximately 90 wt. % ODCB, and 10 wt. % of low-volatile materials and PEKK solids.

The PEKK synthesis residue composition was observed to be a white, moderately viscous slurry.

Example 1: Recovery of the Residual Solvents and Reactants Deriving from the Synthesis of 1,4-bis(4-phenoxybenzoyl)benzene with a Conventional Apparatus The residue composition deriving from the synthesis of 1,4-bis(4-phenoxybenzoyl)benzene was treated in a Rotavap (rotating flask) apparatus at a vacuum of 23 mm Hg, with the flask being heated at 170° C. by a hot oil batch. Although substantially all of the ODCB and more than 80% of the DPE were recovered, the concentrated residue formed a crust on the inside surface of the rotating flask which could only be removed by scraping.

Examples 2-8: Recovery of the Residual Solvents and Reactants Deriving from the Synthesis of 1,4-bis(4-phenoxybenzoyl)benzene or PEKK with a Thin Film Evaporator The residue compositions deriving from the synthesis of 1,4-bis(4-phenoxybenzoyl)benzene and/or the synthesis of PEKK, as described prior to Example 1, were continuously fed to a pilot-scale thin film evaporator (TFE) operating under vacuum. The TFE was heated with hot oil via a jacket, and operated under vacuum ranging from 500 to 3000 Pa. The temperature of the concentrated residues exiting the evaporator was measured and controlled over a range of 160-175° C., by adjusting the heating hot oil temperature and vacuum. The residual composition deriving from the synthesis of 1,4-bis(4-phenoxybenzoyl)benzene or PEKK or mixtures of the two were continuously fed at a rate ranging from 100 to 250 kg/hr·m². The TFE rotor operated at a range of speeds corresponding to shear rates from 70 to 280 s⁻¹.

The TFE vapors were condensed and collected, and the concentrated residues were also collected (under vacuum). The condensed vapors were analyzed and found to be mixture of ODCB and DPE, and were tested by chromatography which confirmed that the recovered ODCB/DPE mixtures contained non-detectable (≤200 ppm) levels of xanthydrol moiety-containing molecules, 4-(4-phenoxybenzoyl) benzoic acid, 1,4-bis(4-phenoxybenzoyl)benzene and other by-products present in the residue compositions fed to the evaporator.

Mass balances were determined by measuring the weights fed or collected over time, and the corresponding stream feed and vapors stream analyses (the concentrated bottoms component flows and compositions were calculated by difference).

Over the range of TFE operating conditions listed above, between 60 and 97% of the combined ODCB and DPE was recovered. The concentrated residues were observed to exit the evaporator as viscous, albeit pourable darkened melts. After cooling, the concentrated residues solidified into wax-like materials.

Figure 2:
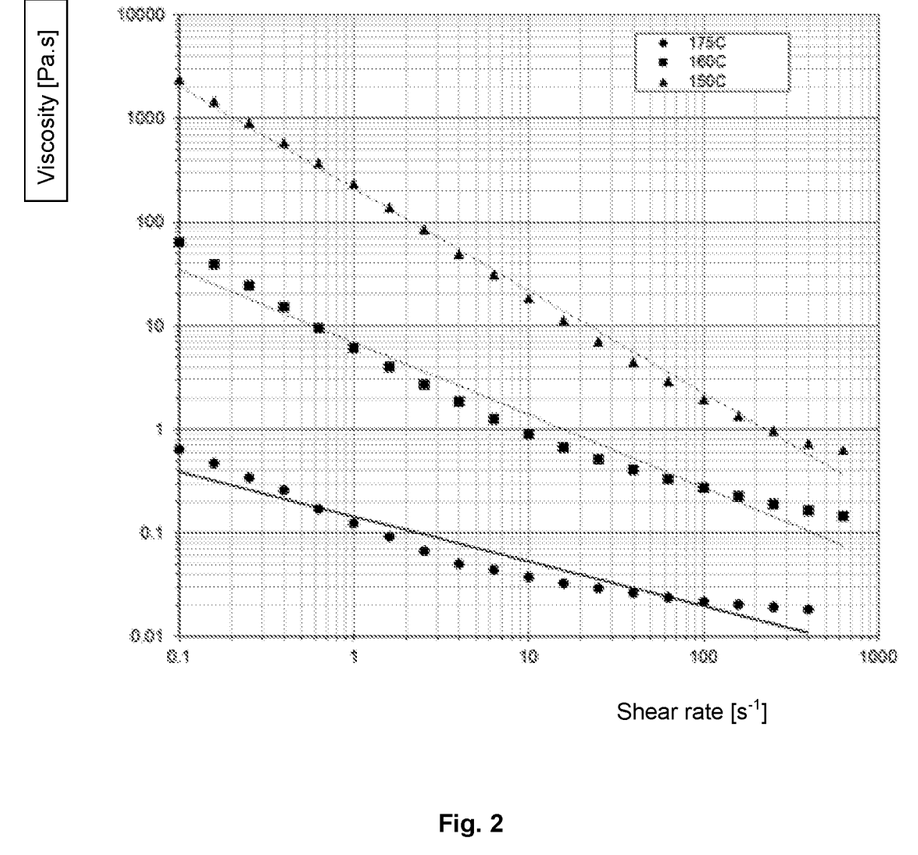
FIG. 2 shows the viscosity (in Pa·s) of concentrated solid residues recovered after evaporating a residue composition deriving from the synthesis of 1,4-bis(4-phenoxybenzoyl) benzene as a function of the shear rate (in $s^{-1}$) at 150° C. (triangle), 160° C. (squares) and at 175° C. (circles).

Rheometry measures, carried out with a rotational Rheometer ARES-G2 by TA Instruments using a parallel plates Geometry with a 25 mm diameter, confirmed that the concentrated residue (after evaporation) was also shear thinning. As illustrated in FIG. 2, the concentrated residue viscosity decreases as the shear rate increases at 150° C. (triangles), 160° C. (squares) and at 175° C. (circles), approximately following a power-law function of the shear rate (lines fitted to the data).

Conventional (non-mechanically sheared) evaporators would be impractical to achieve the high solvent recoveries with the residue compositions: in the absence of shear, the viscosities of the concentrated residues would be on the order of tens of Pa·s (compared to water which is less than 0.001 Pa·s), so that it would not readily flow out of the evaporator. Furthermore, heat transfer coefficients (U) decrease exponentially with viscosity: U is proportional to the Nusselt number, and from the Seider-Tate correlation, it can be shown that the heat transfer coefficient is proportional to the inverse of the viscosity raised to the power 0.47 (i.e. $U \propto (1/\mu))^{0.47}$). The heat transfer area required for a given heat duty (evaporation rate) is inversely proportional to the heat transfer coefficient (A=Q/UΔT), hence the required heat transfer area increases with the viscosity raised to the power 0.47. Thus, viscosities would be on the order of 100-1000 times higher in a conventional evaporator, which would require on the order of 10-25 times larger heat transfer surfaces, compared to a shear-generating evaporating device.

Based on the material balances and the physicochemical properties of the various chemical species in the feed residue compositions, vapors, and concentrated residues, a process model (using the Aspen Plus chemical process simulation software) was developed to predict the TFE performance for a given residue composition feed stream, as a function of TFE operating conditions. The residue composition feeds to the TFE, operating conditions, and vapors recoveries calculated by the model for Examples 2-8 are given in

TABLE 1

The shear rates for these examples were selected to give similar concentrated residue viscosities (based on the model).

| | | Examples | | | | | | |
|---|---|---|---|---|---|---|---|---|
| | | 2 | 3 | 4 | 5 | 6 | 7 | 8 |
| Residual Composition feed (wt. %) | ODCB | 58.6 | 58.6 | 58.6 | 79.3 | 33.7 | 90.0 | 39.5 |
| | DPE | 31.4 | 31.4 | 31.4 | 15.7 | 50.3 | 0.0 | 49.5 |
| | Solids | 10.0 | 10.0 | 10.0 | 5.0 | 16.0 | 10.0 | 11.0 |
| Evaporator Operating Conditions | Pressure (torr) | 20 | 10 | 5 | 10 | 10 | 350 | 10 |
| | Temperature (° C.) | 200 | 175 | 165 | 175 | 175 | 151 | 175 |
| | Shear rate (s⁻¹) | 15 | 180 | 600 | 45 | 250 | 1250 | 180 |
| Recoveries (% of feed) | ODCB | 99.1 | 99.2 | 99.4 | 98.9 | 99.4 | 82.8 | 99.4 |
| | DPE | 83.1 | 82.6 | 82.7 | 64.3 | 89.5 | 0.0 | 87.9 |
| | ODCB + DPE | 93.5 | 93.4 | 93.5 | 93.1 | 93.5 | 82.8 | 93.0 |
| Purity (wt. %) | ODCB | 69.0 | 69.1 | 69.1 | 88.6 | 42.7 | 100.0 | 47.4 |
| | DPE | 31.0 | 30.9 | 30.9 | 11.4 | 57.3 | 0.0 | 52.6 |
| Concentrate (wt. %) | Solids | 63.2 | 62.8 | 63.2 | 43.4 | 74.4 | 39.2 | 63.8 |

Examples 2, 3, and 4 illustrate that similar solvent and reactant recoveries from the residual composition deriving from the synthesis of 1,4-bis(4-phenoxybenzoyl)benzene can be achieved by trading-off evaporation temperature and vacuum (i.e. deeper vacuum needed at lower temperatures).

Examples 3, 5, and 6 illustrate that high solvent recoveries from the residual composition deriving from the synthesis of 1,4-bis(4-phenoxybenzoyl)benzene can be achieved over a range of solids/byproducts loadings, and that substantially all of the ODCB solvent can be recovered, even when the feed residue composition is relatively dilute (lower viscosity, to facilitate easier transfer from the upstream primary ODCB recovery distillation unit). It is recommended that the evaporator shear rate be increased proportionally to the solids/byproducts loading.

Example 7 illustrates that high solvent recoveries from the residual composition deriving from the synthesis of PEKK can also be achieved, and that milder vacuum is required to achieve a target evaporation temperature, compared to the evaporating the residual composition deriving from the synthesis of 1,4-bis(4-phenoxybenzoyl)benzene.

Example 8 illustrates that high solvent recoveries from a mixture of the residual compositions deriving from the syntheses of 1,4-bis(4-phenoxybenzoyl)benzene and PEKK can be achieved, at evaporator conditions comparable to those use for solvent recovery from residual compositions deriving from the synthesis of 1,4-bis(4-phenoxybenzoyl) benzene alone.

EMBODIMENTS

1. A method for treating a shear-thinning residue composition deriving from the synthesis of a aryl ether ketone, said residue composition comprising a liquid fraction and solid residues, the method comprising the steps of:
(i) passing said shear-thinning residue composition through a shear-generating evaporating device, between a rotating part and a stationary part; and
(ii) recovering a condensed liquid fraction and separately recovering concentrated solid residues.

2. The method according to embodiment 1, wherein a shear rate is applied to the shear-thinning residue composition by the shear-generating evaporating device, the shear rate being equal to or greater than 10 s-1, preferably equal to or greater than 250 s-1, more preferably equal to or greater than 1000 s-1, and even more preferably equal to or greater than 2500 s-1.

3. The method according to any one of embodiments 1 or 2, wherein the shear thinning residue composition has a zero shear viscosity at 25° C. from 1 to 10000 Pa·s, preferably from 1 to 1000 Pa·s, more preferably from 1 to 100 Pa·s and even more preferably from 5 to 50 Pa·s.

4. The method according to any one of embodiments 1 to 3, wherein the minimum distance between the rotating part and the stationary part of the shear-generating evaporating device is from 0.03 to 5 mm, and preferably from 0.05 to 3.5 mm.

5. The method according to any one of embodiments 1 to 4, wherein the aryl ether ketone is chosen from 1,4-bis(4-phenoxybenzoyl)benzene and/or a poly ether ketone ketone polymer.

6. The method according to any one of embodiments 1 to 5, wherein the liquid fraction of the shear-thinning residue composition comprises at least one residual solvent and/or at least one residual reactant.

7. The method according to embodiment 6, wherein the liquid fraction of the shear-thinning residue composition comprises at least one residual solvent, wherein the residual solvent is chosen from carbon disulfide, ortho-dichlorobenzene, meta dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof; and wherein the residual solvent is preferably ortho-dichlorobenzene.

8. The method according to embodiment 6 or 7, wherein the liquid fraction of the shear-thinning residue composition comprises at least one residual reactant, wherein the residual reactant is diphenyl ether.

9. The method according to any one of embodiments 1 to 8, wherein the solid residues comprise aryl ether ketone particles such as 1,4-bis(4-phenoxybenzoyl)benzene and/or a poly ether ketone ketone polymer, and/or reaction by-products resulting from an incomplete conversion to the reaction products and/or by-products resulting from a side reaction.

10. The method according to any one of embodiments 1 to 9, wherein the shear generating evaporating device is chosen from a horizontal thin-film evaporator, a vertical thin-film evaporator, a horizontal wiped-film evaporator, a vertical wiped-film evaporator, a scraped-surface heat exchanger, a single-screw devolatilizing extruder, and a twin-screw devolatilizing extruder.

11. The method according to any one of embodiments 1 to 10, wherein the method is carried out as a batch process, or a semi-batch process, or a continuous process.

12. The method according to any one of embodiments 1 to 11, wherein the shear thinning residue composition has a solids concentration before step (i) from 5 to 25 wt. %, and preferably from 15 to 20 wt. %.

13. The method according to any one of embodiments 1 to 12, wherein during step (i) the shear thinning residue composition is brought to a temperature equal to or greater than 160° C., preferably equal to or greater than 170° C., and more preferably equal to or greater than 175° C.

14. The method according to any one of embodiments 1 to 13, further comprising a subsequent step of:
(iii) using the concentrated solid residues as a fuel source.

15. The method according to any one of embodiments 1 to 14, wherein the condensed liquid fraction recovered in step (ii) is recycled in the synthesis of the aryl ether ketone, and preferably in the synthesis of 1,4-bis(4-phenoxybenzoyl)benzene and/or the synthesis of a poly ether ketone ketone polymer.

16. The method according to embodiment 15, wherein the condensed liquid fraction recovered in step (ii) comprises at least one residual solvent and at least one residual reactant which are separated prior to recycling and are recycled separately.

17. The method according to any one of embodiments 1 to 16, wherein from 65 to 99 wt. % and more preferably from 75 to 97 wt. % of the liquid fraction of the shear-thinning residue composition is recovered in the recovered condensed liquid fraction.

18. The method according to any one of embodiments 1 to 17, comprising a preliminary step of providing the shear-thinning residue composition, said preliminary step comprising recovering a mother liquor from the synthesis of an aryl ether ketone, distilling said mother liquor, and recovering the shear-thinning residue composition as a distillation residue.

19. A method for manufacturing an aryl ether ketone, comprising:
reacting a reactant A with a reactant B in a reaction solvent, so as to obtain a product mixture comprising the aryl ether ketone, wherein reactant A is a difunctional aromatic molecule containing one or more oxygen atoms, wherein reactant B is a difunctional aromatic molecule containing one or more halogen atoms;
subjecting the product mixture to a solid/liquid separation so as to recover a purified aryl ether ketone and separately recover a mother liquor; and either:
subjecting the mother liquor to a method for treating a shear-thinning residue composition, said mother liquor forming part or all of the shear-thinning residue composition; or
distilling said mother liquor, recovering a shear-thinning residue composition as a distillation residue, and subjecting said recovered shear thinning residue composition to the method for treating a shear-thinning residue composition, wherein the method for treating a shear-thinning residue composition is the method of any one of embodiments 1 to 17.

20. The method of embodiment 19, wherein the aryl ether ketone is 1,4 bis(4-phenoxybenzoyl)benzene, reactant A is terephthaloyl chloride, and reactant B is diphenyl ether.

21. The method of embodiment 19, wherein the aryl ether ketone is a poly ether ketone ketone polymer, reactant A is a difunctional aromatic acyl chloride, and reactant B is 1,4-bis(4-phenoxybenzoyl)benzene.

22. The method according to embodiment 21, comprising a preliminary stage of manufacturing 1,4-bis(4-phenoxybenzoyl)benzene according to embodiment 20, and wherein, optionally, the shear-thinning residue composition deriving from the synthesis of 1,4-bis(4-phenoxybenzoyl)benzene is at least partially mixed with the shear-thinning residue composition deriving from the synthesis of the poly ether ketone ketone polymer prior to subjecting them to the method of any one of embodiments 1 to 18.

23. The method according to any one of embodiments 19 to 22, wherein the reaction solvent is chosen from carbon disulfide, ortho dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof; and wherein the reaction solvent is preferably ortho-dichlorobenzene.

24. The method according to any one of embodiments 19 to 23, wherein the solid/liquid separation step comprises a filtration step, preferably a centrifugal filtration step.

The invention claimed is:

1. A method for treating a shear-thinning residue composition deriving from the synthesis of a aryl ether ketone, said residue composition comprising a liquid fraction and solid residues, the method comprising the steps of:
   (i) passing said shear-thinning residue composition through a shear-generating evaporating device, between a rotating part and a stationary part; and
   (ii) recovering a condensed liquid fraction and separately recovering concentrated solid residues.

2. The method according to claim 1, wherein a shear rate is applied to the shear-thinning residue composition by the shear-generating evaporating device, the shear rate being equal to or greater than $10 \text{ s}^{-1}$.

3. The method according to claim 1, wherein the shear-thinning residue composition has a zero shear viscosity at 25° C. from 1 to 10000 Pa·s.

4. The method according to claim 1, wherein the minimum distance between the rotating part and the stationary part of the shear-generating evaporating device is from 0.03 to 5 mm.

5. The method according to claim 1, wherein the aryl ether ketone is chosen from 1,4-bis(4-phenoxybenzoyl)benzene and/or a poly ether ketone ketone polymer.

6. The method according to claim 1, wherein the liquid fraction of the shear-thinning residue composition comprises at least one residual solvent and/or at least one residual reactant.

7. The method according to claim 6, wherein the liquid fraction of the shear-thinning residue composition comprises at least one residual solvent, wherein the residual solvent is chosen from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof.

8. The method according to claim 6, wherein the liquid fraction of the shear-thinning residue composition comprises at least one residual reactant, wherein the residual reactant is diphenyl ether.

9. The method according to claim 1, wherein the solid residues comprise aryl ether ketone particles such as 1,4-bis(4-phenoxybenzoyl)benzene and/or a poly ether ketone ketone polymer, and/or reaction by-products resulting from an incomplete conversion to the reaction products and/or by-products resulting from a side reaction.

10. The method according to claim 1, wherein the shear-generating evaporating device is chosen from a horizontal thin-film evaporator, a vertical thin-film evaporator, a horizontal wiped-film evaporator, a vertical wiped-film evaporator, a scraped-surface heat exchanger, a single-screw devolatilizing extruder, and a twin-screw devolatilizing extruder.

11. The method according to claim 1, wherein the method is carried out as a batch process, or a semi-batch process, or a continuous process.

12. The method according to claim 1, wherein the shear-thinning residue composition has a solids concentration before step (i) from 5 to 25 wt. %.

13. The method according to claim 1, wherein during step (i) the shear-thinning residue composition is brought to a temperature equal to or greater than 160° C.

14. The method according to claim 1, further comprising a subsequent step of:
   (iii) using the concentrated solid residues as a fuel source.

15. The method according to claim 1, wherein the condensed liquid fraction recovered in step (ii) is recycled in the synthesis of the aryl ether ketone.

16. The method according to claim 15, wherein the condensed liquid fraction recovered in step (ii) comprises at least one residual solvent and at least one residual reactant which are separated prior to recycling and are recycled separately.

17. The method according to claim 1, wherein from 65 to 99 wt. % of the liquid fraction of the shear-thinning residue composition is recovered in the recovered condensed liquid fraction.

18. The method according to claim 1, comprising a preliminary step of providing the shear-thinning residue composition, said preliminary step comprising recovering a mother liquor from the synthesis of an aryl ether ketone, distilling said mother liquor, and recovering the shear-thinning residue composition as a distillation residue.

19. A method for manufacturing an aryl ether ketone, comprising:
   reacting a reactant A with a reactant B in a reaction solvent, so as to obtain a product mixture comprising the aryl ether ketone, wherein reactant A is a difunctional aromatic molecule containing one or more oxygen atoms, wherein reactant B is a difunctional aromatic molecule containing one or more halogen atoms;
   subjecting the product mixture to a solid/liquid separation so as to recover a purified aryl ether ketone and separately recover a mother liquor; and
   either:
      subjecting the mother liquor to a method for treating a shear-thinning residue composition, said mother liquor forming part or all of the shear-thinning residue composition; or
      distilling said mother liquor, recovering a shear-thinning residue composition as a distillation residue, and subjecting said recovered shear-thinning residue composition to the method for treating a shear-thinning residue composition,
   wherein the method for treating a shear-thinning residue composition is the method of claim 1.

20. The method of claim 19, wherein the aryl ether ketone is 1,4-bis(4-phenoxybenzoyl)benzene, reactant A is terephthaloyl chloride, and reactant B is diphenyl ether.

21. The method of claim 19, wherein the aryl ether ketone is a poly ether ketone ketone polymer, reactant A is a difunctional aromatic acyl chloride, and reactant B is 1,4-bis(4-phenoxybenzoyl)benzene.

22. The method according to claim 19, wherein the reaction solvent is chosen from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof.

23. The method according to claim 19, wherein the solid/liquid separation step comprises a filtration step.

24. A method for manufacturing a poly ether ketone ketone polymer, comprising:
   reacting terephthaloyl chloride with diphenyl ether in a reaction solvent, so as to obtain a product mixture comprising 1,4-bis(4-phenoxybenzoyl)benzene;

subjecting the product mixture to a solid/liquid separation so as to recover a purified 1,4-bis(4-phenoxybenzoyl)benzene and separately recover a mother liquor; and either:
- subjecting the mother liquor to a method for treating a shear-thinning residue composition, said mother liquor forming part or all of the shear-thinning residue composition; or
- distilling said mother liquor, recovering a shear-thinning residue composition as a distillation residue, and subjecting said recovered shear-thinning residue composition to the method for treating a shear-thinning residue composition, reacting a difunctional aromatic acyl chloride with the 1,4-bis(4-phenoxybenzoyl)benzene in a reaction solvent, so as to obtain a product mixture comprising the poly ether ketone ketone polymer;

subjecting the product mixture to a solid/liquid separation so as to recover a purified poly ether ketone ketone polymer and separately recover a mother liquor; and either:
- subjecting the mother liquor to a method for treating a shear-thinning residue composition, said mother liquor forming part or all of the shear-thinning residue composition; or
- distilling said mother liquor, recovering a shear-thinning residue composition as a distillation residue, and subjecting said recovered shear-thinning residue composition to the method for treating a shear-thinning residue composition, wherein the method for treating a shear-thinning residue composition is the method of claim 1, and wherein, optionally, the shear-thinning residue composition deriving from the synthesis of 1,4-bis(4-phenoxybenzoyl)benzene is at least partially mixed with the shear-thinning residue composition deriving from the synthesis of the poly ether ketone ketone polymer prior to subjecting them to the method.

25. The method according to claim 24, wherein the reaction solvent is chosen from carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,1-dichloroethane, 1,2-dichloroethane, 1,1,2,2-tetrachloroethane, tetrachloroethylene, dichloromethane, nitrobenzene and mixtures thereof.

26. The method according to claim 24, wherein the solid/liquid separation step comprises a filtration step.

* * * * *